United States Patent
Tominaga

(10) Patent No.: US 7,362,559 B2
(45) Date of Patent: Apr. 22, 2008

(54) CERAMIC CHIP-TYPE ELECTRONIC COMPONENT WITH ELECTRODE COVERING RESIN AND METHOD OF MAKING THE SAME

(75) Inventor: Yukio Tominaga, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 200 days.

(21) Appl. No.: 11/401,509

(22) Filed: Apr. 11, 2006

(65) Prior Publication Data

US 2006/0238948 A1    Oct. 26, 2006

(30) Foreign Application Priority Data

Apr. 14, 2005    (JP)    ............................. 2005-117347

(51) Int. Cl.
*H01G 4/228*    (2006.01)
(52) U.S. Cl. ............... 361/306.1; 361/306.3; 361/308.1; 361/311; 361/313; 361/321.1; 361/321.2
(58) Field of Classification Search ............ 361/306.1, 361/306.3, 302–305, 307, 308.1, 309, 311–313, 361/321.1, 321.2, 321.4, 321.5, 329–330
See application file for complete search history.

(56) References Cited

U.S. PATENT DOCUMENTS

| | | | |
|---|---|---|---|
| 5,712,758 A * | 1/1998 | Amano et al. ............ | 361/321.2 |
| 5,963,416 A * | 10/1999 | Honda et al. ............ | 361/306.1 |
| 6,181,544 B1 * | 1/2001 | Nakagawa et al. ....... | 361/321.1 |
| 6,191,933 B1 * | 2/2001 | Ishigaki et al. ............ | 361/309 |
| 6,288,887 B1 * | 9/2001 | Yoshida et al. .......... | 361/306.1 |
| 6,587,327 B1 * | 7/2003 | Devoe et al. ............ | 361/306.3 |
| 6,704,189 B2 * | 3/2004 | Yoshii et al. ............ | 361/308.1 |
| 7,113,389 B2 * | 9/2006 | Ishifune et al. .......... | 361/306.3 |
| 7,177,137 B2 * | 2/2007 | Ritter et al. ............. | 361/306.3 |
| 7,215,531 B2 * | 5/2007 | Naito et al. .............. | 361/306.1 |

FOREIGN PATENT DOCUMENTS

| | | |
|---|---|---|
| JP | 2003-7567 | 1/2003 |
| JP | 2004-296936 | 10/2004 |

* cited by examiner

*Primary Examiner*—Nguyen T. Ha
(74) *Attorney, Agent, or Firm*—Hamre, Schumann, Mueller & Larson, P.C.

(57) ABSTRACT

A chip-type electronic component includes a ceramic chip body incorporating an element, an external electrode formed on a side surface of the chip body, a conductive elastic resin film which is larger in width than the external electrode and formed to cover the external electrode and extend onto part of a mount surface of the chip body, and a metal plating film for soldering formed on the conductive elastic resin film.

5 Claims, 2 Drawing Sheets

CERAMIC CHIP-TYPE ELECTRONIC COMPONENT WITH ELECTRODE COVERING RESIN AND METHOD OF MAKING THE SAME

BACKGROUND OF THE INVENTION

1. Field of the Invention

The present invention relates to a ceramic chip-type electronic component such as a multilayer ceramic capacitor or a chip resistor, for example. The invention further relates to a method of making such an electronic component.

2. Description of the Related Art

Conventionally, a multilayer ceramic capacitor generally includes a chip body and at least one pair of external electrodes. The chip body is formed by sintering a plurality of ceramic green sheets laminated one upon another. A single pair of external electrodes is utilized as parts for a single capacitor element. The external electrodes are formed by sputtering of metal such as copper or by the application of metal paste such as copper paste, for example.

The multilayer ceramic capacitor having the above-described structure has a drawback that the chip body easily cracks or chips. For instance, when the multilayer ceramic capacitor is soldered on e.g. a printed circuit board, such cracking or chipping may occur due to the shock from the outside or the thermal expansion difference between the multilayer ceramic capacitor and the printed circuit board.

To solve such a problem, JP-A-2003-7567 (hereinafter referred to as "document 1") discloses a chip-type electronic component in which a conductive elastic resin film is formed on a surface of the chip body to prevent such cracking or chipping. The chip-type electronic component is so mounted on a printed circuit board that the surface with the conductive elastic resin film faces the printed circuit board. Therefore, the elasticity of the conductive elastic resin film absorbs the shock from the outside to the chip body or the thermal expansion difference.

Similarly, to prevent the cracking or chipping, JP-A 2004-296936 (hereinafter referred to as "document 2") proposes to form a conductive elastic resin film on an external electrode. In the technique disclosed in this document, the width of the conductive elastic resin film is equal to that of the external electrode.

According to the above-described document 1, the elasticity of the conductive elastic resin film absorbs the shock or the thermal expansion difference. In this structure, however, the external electrode of the chip-type electronic component is bonded to the printed circuit board via a solder fillet. Therefore, in spite of the provision of the conductive elastic resin film, the influence of the shock or the thermal expansion difference is not sufficiently lessened, and hence, the cracking or chipping of the chip body may not be effectively prevented.

According to the above-described document 2, a conductive elastic resin film having the same width as that of an external electrode is provided on the external electrode. In this structure, the side surfaces of the external electrode are exposed without being covered by the conductive elastic resin film. Therefore, when the chip-type electronic component is mounted on a printed circuit board, a solder fillet is formed on the exposed side surfaces of the external electrode. Therefore, similarly to the structure of the document 1, the external electrode is bonded to the printed circuit board via the solder fillet, so that the cracking or chipping of the chip body may not be effectively prevented.

Further, in the structure of the document 2, the conductive elastic resin film contacts only one surface of the external electrode and does not directly support the chip body. Therefore, there is a large possibility that the conductive elastic resin film separates due to the shock from the outside to the chip body or the thermal expansion difference.

SUMMARY OF THE INVENTION

The present invention is conceived under the above-described circumstances. It is, therefore, an object of the present invention is to provide an electronic component in which the incidence of breakage such as cracking or chipping of the chip body is reduced. Another object of the present invention is to provide a method of making such an electronic component.

According to a first aspect of the present invention, there is provided a chip-type electronic component comprising: a ceramic chip body incorporating an element and including a mount surface and a side surface; an external electrode for the element formed on the side surface of the chip body; a conductive elastic resin film which is larger in width than the external electrode and formed to cover the external electrode and extend onto part of the mount surface of the chip body; and a metal plating film for soldering formed on the conductive elastic resin film.

With such a structure, when the chip-type electronic component is mounted on a circuit board, the chip body is supported horizontally by the solder fillet via the conductive elastic resin film. Further, the chip body is supported vertically by the printed circuit board via the conductive elastic resin film. Therefore, the elasticity of the conductive elastic resin film absorbs the shock from the outside or the thermal expansion difference. As a result, the cracking or chipping due to such shock or thermal expansion difference can be effectively prevented.

Further, with such a structure, the conductive elastic resin film is held in contact with both the chip body and the external electrode. Therefore, the bonding of the conductive elastic resin film is reliably maintained, and the separation of the conductive elastic resin film is prevented.

Preferably, the width of the external electrode is not more than 0.6 times the width of the conductive elastic resin film. With such a structure, the bonding of the conductive elastic resin film to the chip body and to the external electrode is further ensured.

Preferably, the conductive elastic resin film has a modulus of elasticity of not more than 17.0 GPa. In such a case, the cracking or chipping is effectively prevented.

According to a second aspect of the present invention, there is provided a method of making a ceramic chip-type electronic component comprising the steps of: forming, on a side surface of a chip body incorporating an element, an external electrode for the element; forming a conductive elastic resin film, which is larger in width than the external electrode, on the external electrode so that the conductive elastic resin film covers the external electrode and extends onto part of either an upper surface or a lower surface of the chip body; and forming, on an obverse surface of the conductive elastic resin film, a metal plating film for soldering.

With such a method, it is possible to produce an electronic component in which the incidence of problems such as cracking or chipping of the chip body or the separation of the conductive elastic resin film is reduced.

Preferably, the method of making a ceramic chip-type electronic component further comprises the steps of subjecting the conductive elastic resin film to surface treatment for causing metal powder contained in the conductive elastic resin film to be exposed at the obverse surface of the conductive elastic resin film before the step of forming the metal plating layer. With this method, the adhesion strength between the conductive elastic resin film and the metal plating film is enhanced.

DETAILED DESCRIPTION OF THE PREFERRED EMBODIMENTS

Preferred embodiments of the present invention will be described below in detail with reference to the accompanying drawings.

Figure 1:
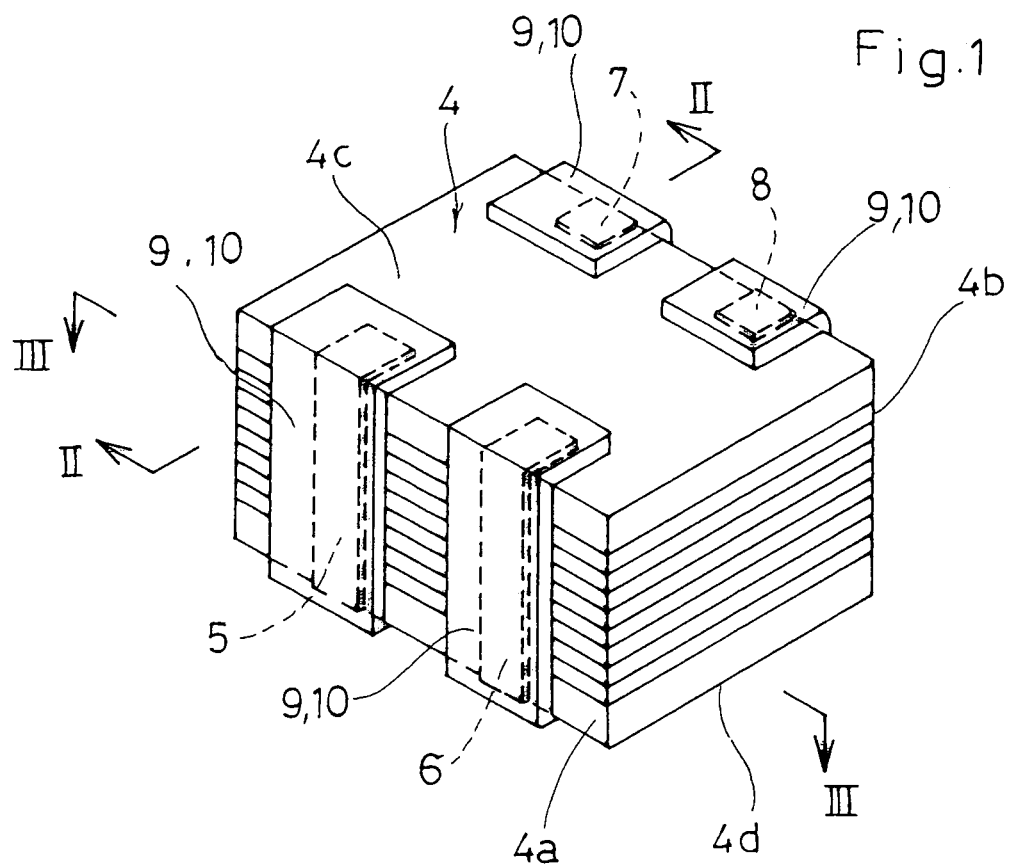
FIG. 1 is a perspective view showing a multilayer ceramic capacitor according to the present invention.
Figure 2:
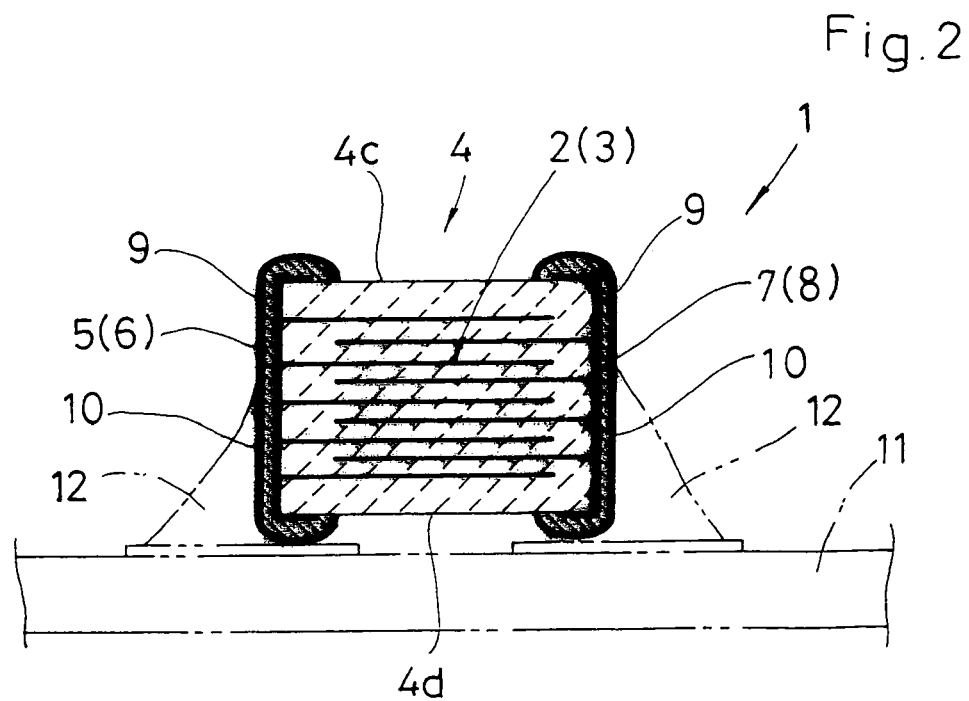
FIG. 2 is a sectional view taken along lines II-II in FIG. 1.
Figure 3:
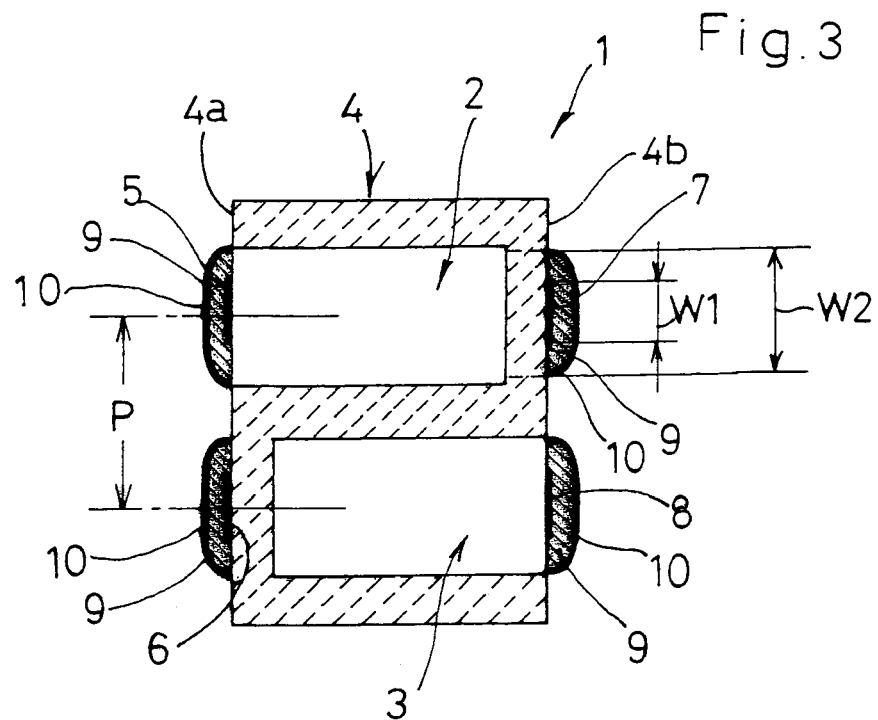
FIG. 3 is a sectional view taken along lines III-III in FIG. 1.

FIGS. 1-3 show a multilayer ceramic capacitor according to an embodiment of the present invention. The multilayer ceramic capacitor 2 is of a two-element type. In other words, the capacitor functions as two capacitor elements 2 and 3, as shown in FIG. 3.

As shown in FIG. 1, the multilayer ceramic capacitor 1 includes a chip body 4, external electrodes 5, 6, 7, 8, conductive elastic resin films 9, and metal plating films 10.

The external electrodes 5 and 7 are the parts for the capacitor element 2, whereas the external electrodes 6 and 8 are the parts for the other capacitor element 3. The external electrodes 5 and 6 are provided on a side surface 4a of the chip body 4, whereas the external electrodes 7 and 8 are provided on a side surface 4b opposite to the side surface 4a. Each of the external electrodes 5-8 has opposite ends partially covering an upper surface 4c and a lower surface 4c of the chip body 4, respectively. The external electrodes 5-8 maybe formed appropriately by sputtering of metal such as copper or by the application of metal paste such as copper paste, for example.

The chip body 4 is formed by sintering a plurality of ceramic green sheets laminated one upon another. The obverse surface of each of the green sheets is provided with an internal electrode which is a part for the capacitor element 2, 3. In this way, the chip body 4 includes the capacitor elements 2 and 3. Each of the internal electrodes is electrically connected to one of the external electrodes 5, 6, 7 and 8.

The four conductive elastic resin films 9 are films having conductivity and made of a mixture of synthetic resin having elasticity and metal powder such as silver. The conductive elastic resin films 9 are formed on part of the side surfaces 4a, 4b, part of the upper surface 4c and part of the lower surface 4d of the chip body 4 to cover the entirety of the external electrodes 5, 6, 7 and 8. The width W1 of each of the external electrodes 5, 6, 7 and 8 is set to not more than 0.6 times the width W2 of each of the conductive elastic resin films 9.

Each of the conductive elastic resin films 9 may be formed as follows. First, conductive elastic resin paste is applied by screen printing, for example. Then, the paste applied is fixed by drying or hardening. Thereafter, the obverse surface of the fixed paste is subjected to surface treatment such as barrel polishing or sand blasting for polishing the surface. In this way, the conductive elastic resin film 9 having an obverse surface at which metal powder is exposed is obtained. By this process, the adhesion of the metal plating film 10, which is to be formed subsequently, to the resin film is enhanced.

The metal plating films 10 serve to facilitate soldering and may comprise tin plating films, for example. The metal plating films 10 may be formed as follows. First, a nickel plating film as an underlayer is formed on the entire surface of each of the conductive elastic synthetic films 9 which has undergone the above-described surface treatment. Subsequently, the metal plating film 10 is formed on the underlayer by electrolytic plating such as barrel plating or electroless plating, for example.

FIG. 2 shows the multilayer ceramic capacitor 1 of the present invention soldered on a printed circuit board 11. The external electrodes 5, 6, 7 and 8 are covered by conductive elastic resin films 9. On the conductive elastic resin films 9, metal plating films 10 are provided. Solder fillets 12 are formed on the metal plating films 10.

The chip body 4 is supported horizontally by the solder fillets 12 via the conductive elastic resin films 9. Further, the chip body 4 is supported vertically by the printed circuit board 11 via the conductive elastic resin films 9. Therefore, the elasticity of the conductive elastic resin films 9 absorb the shock from the outside to the chip body 4 or the thermal expansion difference between the multilayer ceramic capacitor and the printed circuit board 10. As a result, the cracking or chipping due to such shock or thermal expansion difference can be effectively prevented.

Further, each of the conductive elastic resin films 9 has a width which is larger than that of each external electrode 5-8 and is held in contact with both the external electrode 5-8 and the chip body 4. Therefore, the bonding of the conductive elastic resin film 9 to the chip body 4 and to the external electrode 5-8 is reliably maintained.

Figure 4:
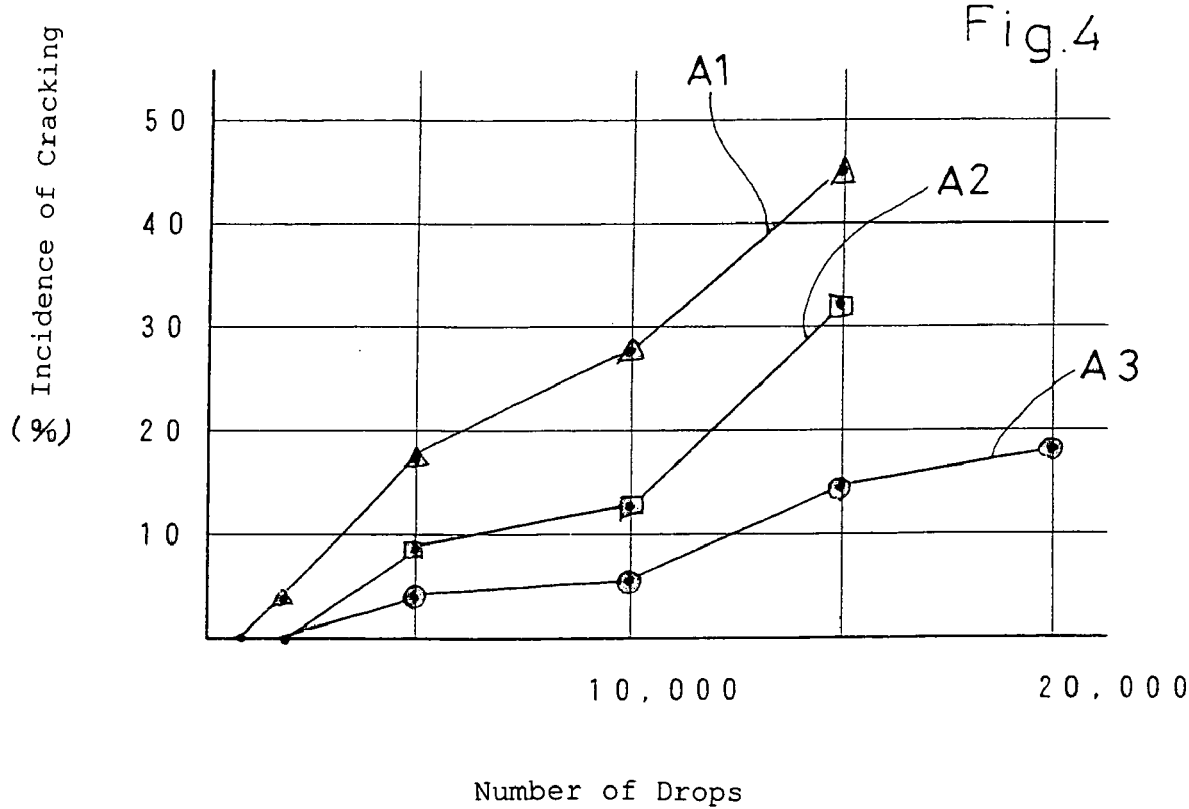
FIG. 4 is a graph showing the relationship between the number of dropping operations performed and the incidence of cracking.

FIG. 4 shows the relationship between the modulus of elasticity of the conductive elastic resin film 9 and the incidence of cracking or chipping, which is obtained by the experiment performed by the inventors of the present invention.

In the graph of the figure, the abscissa shows the number of dropping operations performed, i.e., how many times a multilayer ceramic capacitor 1 soldered to a printed circuit board 12 was dropped from a height of one meter. The ordinate shows the incidence of cracking. The plurality of lines in the graph shows the incidences of cracking in the cases of utilizing conductive elastic resin films 9 of different modulus of elasticity. Specifically, the lines A1, A2 and A3 indicate the incidences of cracking in the cases of utilizing the conductive elastic resin films having modulus of elasticity of 17.0 GPa (gigapascal), 9.1 GPa and 6.1 GPa, respectively. As can be understood from the graph, a lower modulus of elasticity provides a lower incidence of cracking.

The inventors of the present invention further performed a similar experiment with respect to conductive elastic resin films 9 which were different from each other in ratio between the width W2 thereof and the width W1 of the external electrodes 5-8. From the experimental results, it was found that when the width W1 exceeds 0.6 times the width W2, the incidence of separation of the conductive elastic resin film 9 from the chip body 4 increases remarkably. This is because the contact area between the conductive elastic resin film 9 and the chip body 4 is reduced so that the adhesion therebetween becomes insufficient. Therefore, although it is desirable to make the width W1 of each external electrode as large as possible to reduce the resistance of the external electrode, the width W1 should not exceed 0.6 times the width W2.

The pitch P between two external electrodes provided adjacent to each other on a same side surface 4a or 4b is determined in advance. The width W2 of each conductive elastic resin film 9 should be determined in view of the predetermined pitch P so that a solder bridge is not formed between the metal plating films 10 on the adjacent conductive elastic resin films 9 in soldering.

The present invention being thus described, it is apparent that the same maybe varied in many ways. For instance, although the multilayer ceramic capacitor 1 in the above-described embodiment incorporates two capacitor elements, the present invention is not limited thereto. The present invention is also applicable to a multilayer ceramic capacitor incorporating a single capacitor element or three or more capacitor elements. The present invention is also applicable to ceramic chip-type electronic components other than a capacitor, such as a chip resistor, a chip inductor or a chip LED, for example. Such variations should not be regarded as a departure from the spirit and scope of the present invention, and all such modifications as would be obvious to those skilled in the art are intended to be included within the scope of the following claims of the present invention.

The invention claimed is:

1. A chip-type electronic component comprising:
    a ceramic chip body incorporating an element and including a mount surface and a side surface;
    an external electrode for the element formed on the side surface of the chip body;
    a conductive elastic resin film which is larger in width than the external electrode and formed to cover the external electrode and extend onto part of the mount surface of the chip body; and
    a metal plating film for soldering formed on the conductive elastic resin film.

2. The chip-type electronic component according to claim 1, wherein the width of the external electrode is not more than 0.6 times the width of the conductive elastic resin film.

3. The chip-type electronic component according to claim 1, wherein the conductive elastic resin film has a modulus of elasticity of not more than 17.0 GPa.

4. A method of making a ceramic chip-type electronic component comprising the steps of:
    forming, on a side surface of a ceramic chip body incorporating an element, an external electrode for the element;
    forming a conductive elastic resin film, which is larger in width than the external electrode, on the external electrode so that the conductive elastic resin film covers the external electrode and extends onto part of either an upper surface or a lower surface of the chip body; and
    forming, on an obverse surface of the conductive elastic resin film, a metal plating film for soldering.

5. The making method according to claim 4, further comprising the steps of subjecting the conductive elastic resin film to surface treatment for causing metal powder contained in the conductive elastic resin film to be exposed at the obverse surface of the conductive elastic resin film before the step of forming the metal plating layer.

* * * * *